(12) United States Patent
Dragone

(10) Patent No.: US 6,594,054 B1
(45) Date of Patent: Jul. 15, 2003

(54) FILTERING SYSTEM FOR ELIMINATING DISPERSION AND METHOD FOR DOING SAME

(75) Inventor: Corrado Pietro Dragone, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,861

(22) Filed: Sep. 15, 1999

(51) Int. Cl.$^7$ ................................................ H04B 10/00
(52) U.S. Cl. ........................ 359/161; 359/117; 359/122
(58) Field of Search ................................. 359/161, 117, 359/122, 127, 128, 156; 385/11

(56) References Cited

U.S. PATENT DOCUMENTS

| | | | |
|---|---|---|---|
| 4,548,479 A | 10/1985 | Yeh | 350/404 |
| 4,566,761 A | 1/1986 | Carlsen et al. | 350/401 |
| 4,685,773 A | 8/1987 | Carlsen et al. | 350/401 |
| 4,987,567 A | 1/1991 | Buhrer | 370/3 |
| 5,473,457 A * | 12/1995 | Ono | 359/161 |
| 5,694,233 A * | 12/1997 | Wu et al. | 359/117 |
| 5,724,165 A * | 3/1998 | Wu | 359/117 |
| 5,771,120 A | 6/1998 | Bergmann | 359/484 |
| 5,892,612 A * | 4/1999 | Miller et al. | 359/250 |
| 6,166,838 A * | 12/2000 | Liu et al. | 359/128 |
| 6,175,435 B1 * | 1/2001 | Watanabe | 359/161 |
| 6,208,442 B1 * | 3/2001 | Liu et al. | 359/127 |
| 6,252,711 B1 * | 6/2001 | Damask et al. | 359/498 |
| 6,285,478 B1 * | 9/2001 | Liu et al. | 359/127 |

OTHER PUBLICATIONS

"Multiplexer/Demultiplexer", P. Melman, W.J. Carlsen and B. Foley, Electronics Letters 18$^{th}$ Jul. 1985, vol. 21, No. 15, pp. 634–635.
"High–order Achromatic Quarterwave Combination Plates and Tuners", Carl F. Buhrer, Applied Optics, vol. 27, No. 15, Aug. 1, 1988, pp. 3166–3169.
"Flat Passband Birefringent Wavelength–Division Multiplexers", W. J. Carlsen and C. Buhrer, Electronics Letters, Jan. 29$^{th}$ 1987, vol. 23, No. 3, pp. 106–107.
"Four Waveplate Dual Tuner for Birefringement Filters and Multiplexers" C.F. Buhrer, Applied Optics, vol. 26, No. 17, Sep. 1, 1987, pp. 3628–3632.

* cited by examiner

*Primary Examiner*—John Tweel

(57) ABSTRACT

A filtering system for eliminating dispersion caused by filtering an optical signal with a birefringent filter. Dispersion is eliminated by causing each signal to be passed twice through a birefringent filter. Dispersion created by the first pass is canceled out by dispersion created in the second pass. The same filter may be used for both passes with a polarization rotation applied between the two passes. Specifically, the first pass produces dispersion defined by transmission coefficients C and D. Because of the polarization rotation, the second pass creates dispersion defined by the complex conjugates of transmission coefficients C and D, which cancel out dispersion caused by the first pass. Mathematically, each transmission coefficient of the first pass is multiplied by its complex conjugate of the second pass, and the resulting transmission coefficients $|C|^2$, $|D|^2$ are entirely free of dispersion caused by the filter. A method for filtering an optical signal using a birefringent filter to eliminate dispersion is also provided.

29 Claims, 10 Drawing Sheets

FILTERING SYSTEM FOR ELIMINATING DISPERSION AND METHOD FOR DOING SAME

FIELD OF THE INVENTION

This invention relates generally to elimination of dispersion caused by filtering of optical signals in optical systems. In particular, the invention relates to elimination of dispersion in systems using wavelength division multiplexing or dense wavelength division multiplexing.

BACKGROUND OF THE INVENTION

The use of wavelength division multiplexing ("WDM") in optical systems is well known for transmitting optical signals along a fiber in optical networks. The information capacity of optical networks has been steadily increasing. The number of wavelength channels transmitted in each fiber typically varies between 8 and 20 and it is believed that it will soon exceed 30, and may eventually approach 50. This requires the use of special filters, known as wavelength routers, in order to separate and combine the various wavelength channels. At the present time, the frequency spacing between channels, or "channel separation" is typically in the range of 50–200 GHz. Due to the limited usable bandwidth of a fiber, as more channels are used, the channel separation decreases. When the channel separation is small, filters with the required sharp cutoff characteristics are difficult to realize with sufficient accuracy. In particular, it is difficult to keep crosstalk from adjacent channels below a satisfactory level, and to produce the desired passband characteristics such as center wavelength and passband flatness. Moreover, a signal transmitted over an optical network typically must pass through several filters, for instance, if the transmission path for a particular signal includes several nodes. For this reason, tighter tolerances must be imposed on the filters because signal distortion, e.g., dispersion, caused by each filter is additive and a signal is further degraded by each filter through which it passes.

To reduce the level of crosstalk between adjacent channels, it is advantageous to separate an incoming signal containing multiple channels into two separate outgoing signals, one containing the channels having the first, third, fifth, etc. longest wavelengths (the "odd" channels) and a second group containing the channels having the second, fourth, sixth, etc. longest wavelengths (the "even" channels). Such an arrangement produces two separate outgoing signals, each having double the channel separation and half the number of channels of the incoming signal. In this manner, the individual channels/signals may be discerned with less crosstalk. This separation into two outgoing signals may be achieved by a slicer.

A slicer is essentially a periodic device having a period equal to the incoming signal's channel separation. The slicer has two output ports, each respectively producing an outgoing signal carrying either the even or the odd channels. Each output port transmits only every other channel and, therefore the channels transmitted to each output port have twice the channel separation of the incoming signal's channels. The output channels may be separated by connecting each output port to suitable channel dropping filters as is known in the art. In most cases, it is desirable that the two output ports have identical responses displaced from each other by half a period. A slicer having excellent passband flatness and low crosstalk may be realized using a set of birefringent plates.

FIG. 1a shows an example of a birefringent filter 20 having a set of four birefringent plates 22, 24, 26, 28 of the same properties and thickness. Each plate is characterized by two orthogonal planes of input polarization producing different delays through the plate. The delay difference between the two polarization choices is denoted by a. Assuming the same delay a for all plates, the periodic frequency response has a period (channel separation) determined by a.

Angles $\theta_1, \theta_2, \ldots, \theta_N$ denote the various angles of rotation of the plates. Each angle specifies the differences between principal planes of polarization of adjacent plates or the input or output reference axes. For example, $\theta_1$ is the angle of the principal plane of the first plate relative to the input reference axis, $\theta_2$ is the angle of the principal plane of the second plate relative to that of the first, and $\theta_N$ specifies the output reference axis relative to the principal plane of the last plate.

Once these angles are selected, the transmission coefficients for each plate, neglecting losses and ignoring a constant delay, are given by the matrix $$\begin{bmatrix} \exp(j\phi/2) & 0 \\ 0 & \exp(-j\phi/2) \end{bmatrix} \quad \text{(Eq. 1)}$$

where the phase factor $\exp(j\phi/2)$ is determined by the optical frequency f and the delay difference a, where $$\phi = \frac{2\pi}{f} a \quad \text{(Eq. 2)}$$

Each relative rotation of the plates is specified by the matrix $$\begin{bmatrix} \cos\theta_i & \sin\theta_i \\ -\sin\theta_i & \cos\theta_i \end{bmatrix} \quad \text{(Eq. 3)}$$

The product of the matrices given in Eqs. 1 and 3 above gives a matrix having coefficients which are the transfer functions between input and output polarizations of the birefringent plate assembly as shown in FIG. 1c. This matrix has the form $$\begin{bmatrix} C(\phi) & -D*(\phi) \\ D(\phi) & C*(\phi) \end{bmatrix} \quad \text{(Eq. 4)}$$

where the first column gives the two transmission coefficients $C(\phi)$, $D(\phi)$ of interest here. The two transmission coefficients in the second column are the complex conjugates of $C(\phi)$ and $D(\phi)$. A filter 20 using birefringent plates is shown in FIG. 1b. Such a filter transforms a linearly polarized input beam into a single output beam containing two orthogonal components that are linearly polarized. These components can be separated into the component beams using a beam displacer 30.

Typically, the input signal includes different wavelength channels that are to be separated and transferred to different fibers. A linearly polarized (e.g., vertically) input signal (e.g., as shown at 21) is transformed by the filter 20 into two linearly polarized signals having orthogonal polarizations (e.g., horizontal and vertical). Using well known methods, the filter can be designed to act as a slicer to cause some of the channels (e.g., the even channels) to be produced in one of the two output polarizations (e.g., vertical) and, the remaining channels to be produced in the other output polarization (e.g., horizontal).

By separating the two polarizations with a beam displacer 30, two separate beams 27, 29 are created that can be transmitted to separate fibers. Here, C and D denote the filter transmission coefficients corresponding to the output polarizations of the separate beams 27, 29. These two coefficients are functions of the signal wavelength and designed to yield approximately unity magnitude in the passbands of C and approximately zero magnitude in the stopbands, neglecting losses. Once C is specified, the magnitude of the complementary coefficient D is also specified, since $|C|^2+|D|^2=1$, because of power conservation neglecting losses. Thus, each passband of C corresponds to a stopband of D, and vice versa. In other words, the channels that are not transmitted by C will be transmitted by D, and vice versa. In such an arrangement, the filter acts as a slicer.

As shown symbolically in FIG. 1c, a birefringent filter characterized by transmission coefficient C for particular input and output polarizations is characterized by coefficients D, C*, –D* for all other polarization states obtained by 90° rotations of the input and output polarizations. Also shown in FIG. 1c are the amplitudes (pC–qD* and pD+qC*) of the output polarizations produced by input amplitudes p, q.

An example of a slicer 10 of the type known in the prior art is shown in FIG. 2. The slicer 10 combines a birefringent filter 20 such as that shown in FIG. 1a with suitable input and output stages. The input stage comprises an input beam displacer 30, producing two separate beams, each having one of two orthogonal polarizations, and a half-wavelength plate 40. The fiber output stage comprises a beam displacer 50, half-wavelength plates 60, 60a, and a polarization combiner 70.

The input beam displacer 30 receives the optical beam originating from the input fiber. The optical beam comprises wavelength multiplexed even and odd wavelength channels, as shown symbolically at 80. The beam displacer 30 produces two separate input beams 82, 84 with orthogonal polarizations, preferably in alignment with the input polarizations that are characteristic of the birefringent filter 20. If the orthogonal polarizations are not aligned, they may be aligned by imposing a polarization rotation before the filter. Each input beam 82, 84 carries all of the wavelength channels. One of the two input beams, e.g., beam 84, is then subjected to a polarization rotation by a half-wavelength plate 90, so that both input beams 82, 84a enter the birefringent filter 20 with the same polarization, referred to herein by way of example as "vertical" as shown in FIG. 2.

The filter produces output beams 82b, 84b containing orthogonal polarizations and both even and odd channels. All even channels are similarly polarized (e.g., vertically) and all odd channels are similarly polarized orthogonally to the even channels (e.g., horizontally). In this simplified example, the orthogonal polarizations of the output beams match the input polarization of the filter, i.e., both have vertical and horizontal polarizations.

In order to separate the even channels from the odd channels, the filter 20 is followed by a beam displacer 50. The same beam displacer 50 may be used to act on both filter output beams 82b, 84b. The beam displacer produces a pair of component beams having orthogonal polarizations for each output beam (i.e., component beams 82c and 82d from output beam 82b and component beams 84c and 84d from output beam 84b). Component beams 82c and 84c (the even pair) carry the even channels and component beams 82d and 84d (the odd pair) carry the odd channels.

Since beams carrying like channels are similarly polarized (i.e., beams 82c and 84c are vertically polarized and beams 82d and 84d are horizontally polarized), the polarization of one beam of each pair is rotated, e.g., by passing one beam of each pair (e.g., 84c of 82c and 84c and 82d of 82d and 84d) through a polarization rotator such as half-wavelength plates 60, 60a. The pairs of orthogonally polarized beams carrying like channels are then combined into slicer beams 86, 88 using a polarization combiner 70. The two slicer output beams, 86, 88, carry either the even or the odd channels, but with both vertical and horizontal polarizations. Thus, the incoming signal carrying all channels is separated into two separate outgoing signals, each carrying half the channels.

Although a slicer using a set of birefringent plates has desirable passband and crosstalk characteristics, a birefringent filter or set of plates is afflicted by finite dispersion. It is generally impossible for a birefringent filter to simultaneously produce zero dispersion for both transmission coefficients C, D. In general, dispersion is primarily caused by nonlinear phase variation of the transmission coefficients of the filter as a function of wavelength. Such dispersion can exceed tolerances as the number of channels increases and the channel separation decreases, particularly when several filters or slicers (several nodes) are cascaded.

SUMMARY OF THE INVENTION

The invention provides a filtering system and method for eliminating dispersion caused by filtering an optical signal with a birefringent filter. The invention is therefore suitable for WDM/DWDM systems with a high number of channels and relatively small channel spacing or in systems where it is desirable to use a less sensitive slicer or demultiplexer.

In accordance with the present invention, dispersion of a signal caused by a particular birefringent filter is entirely eliminated by passing the signal through a second filter producing the opposite phase variation of the first filter. In the preferred embodiment, this is achieved by passing the signal through the same birefringent filter twice with a 90 degree polarization rotation imposed between the two passes.

Specifically, an optical beam carrying the signal is first passed through a birefringent filter and a beam displacer to create two component beams having orthogonal polarizations. The component beams are then subjected to a 90 degree polarization rotation before a second pass through the filter. In the preferred embodiment, a corner reflector is used to reverse the direction of the beams between the passes. Accordingly, the first pass produces two component beams with dispersion defined by transmission coefficients C, D (as in the example of FIG. 2) and the second pass produces dispersion defined by the complex conjugates of C and D, namely, –D*, C*. As a result, real-valued transmission coefficients $|C(\phi)|^2$, $|D(\phi)|^2$ are obtained. Dispersion of the signal caused by the first pass through the filter is entirely eliminated because it is exactly canceled out by dispersion caused by the second pass through the filter.

DETAILED DESCRIPTION

The present invention relates to elimination of dispersion caused by filtering of an optical signal with a birefringent filter. An important property of birefringent filters is that they are characterized by two orthogonal planes of output polarization corresponding to two possible choices for input polarization. Either polarization choice is acceptable for most purposes, e.g., to separate wavelength multiplexed channels, since the transmission coefficients of both polarization choices have the same magnitudes. However, the polarization choices differ in two respects. First, the transmission coefficients resulting from the two choices have opposite phases. For a particular filter producing coefficients C, D for a particular input polarization, a rotation of the input polarization by 90 degrees will produce transmission coefficients −D*, C*, i.e., the complex conjugates of C, D. This means that the two polarization choices produce exactly, opposite dispersions.

Second, the roles of the filter's two output ports are interchanged relative to the two polarization choices. In other words, if the even and odd channels are transferred respectively to output ports 1 and 2 with the first polarization choice, they are transferred respectively to ports 2 and 1 with the second polarization choice. In addition, the transmission coefficients do not change if a direction of transmission is reversed.

By eliminating dispersion caused by a birefringent filter, many filters and/or slicers comprising such filters can be cascaded in an optical network without exceeding required tolerances. This is particularly important when the number of channels is high and the channel separation is low. The invention is applicable to any birefringent filter arrangement, but is particularly useful in a slicer comprising a birefringent filter. Accordingly, the following description focuses, by way of example, on a slicer comprising a birefringent filter.

Figure 3:
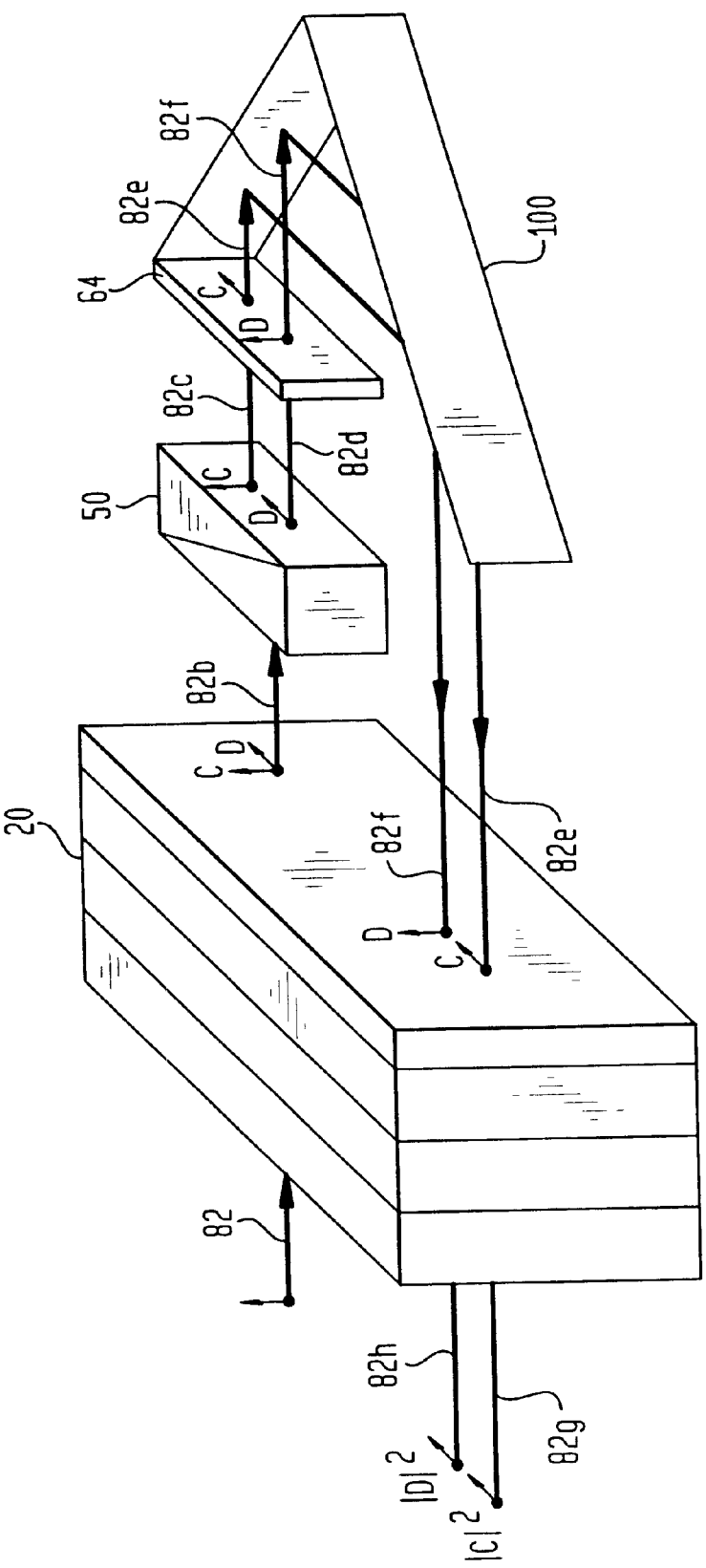
FIG. 3 shows an exemplary birefringent filtering system in accordance with the present invention.

The preferred embodiment includes a single filter, double pass filtering arrangement. Such an arrangement is shown in FIG. 3, illustrating only one of the two input beams entering the filter (beam 82) and omitting, for simplicity, the fiber input and output stages before and after the filter. The arrangement involves five steps: 1) a first pass through the birefringent filter; 2) a pass through a beam displacer; 3) a pass through a polarization rotator to impart the required polarization rotation; 4) a pass into a redirector and 5) a second pass through the birefringent filter.

Vertically polarized optical input beam 82 contains both even and odd channels and enters the filter 20 as shown in FIG. 3. The first pass of input beam 82 through the filter 20 creates a single output beam 82b in which the even channels are vertically polarized and the odd channels are horizontally polarized, for example. The vertical (even channels) and horizontal (odd channels) polarizations of the output beam 82b are separated by a beam displacer 50 into vertically polarized component beam 82c (even channels) and horizontally polarized component beam 82d (odd channels). While a birefringent filter will always create a single output beam having orthogonal output polarizations, the output polarizations will not necessarily align with the filter's planes of input polarization (horizontal and vertical in this example), as in this example.

Figure 5A:
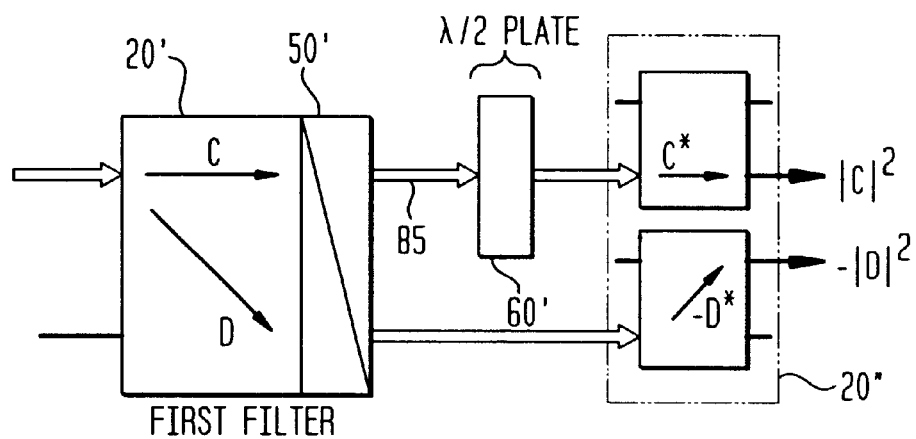
FIG. 5a shows a symbolic representation of a multi-filter arrangement in accordance with the present invention in which the polarization of one component beam is rotated before combining transfer coefficients C and D with their complex conjugates C* and −D* to give real valued coefficients $|C|^2$ and $|D|^2$ which are entirely free of dispersion.
Figure 5B:
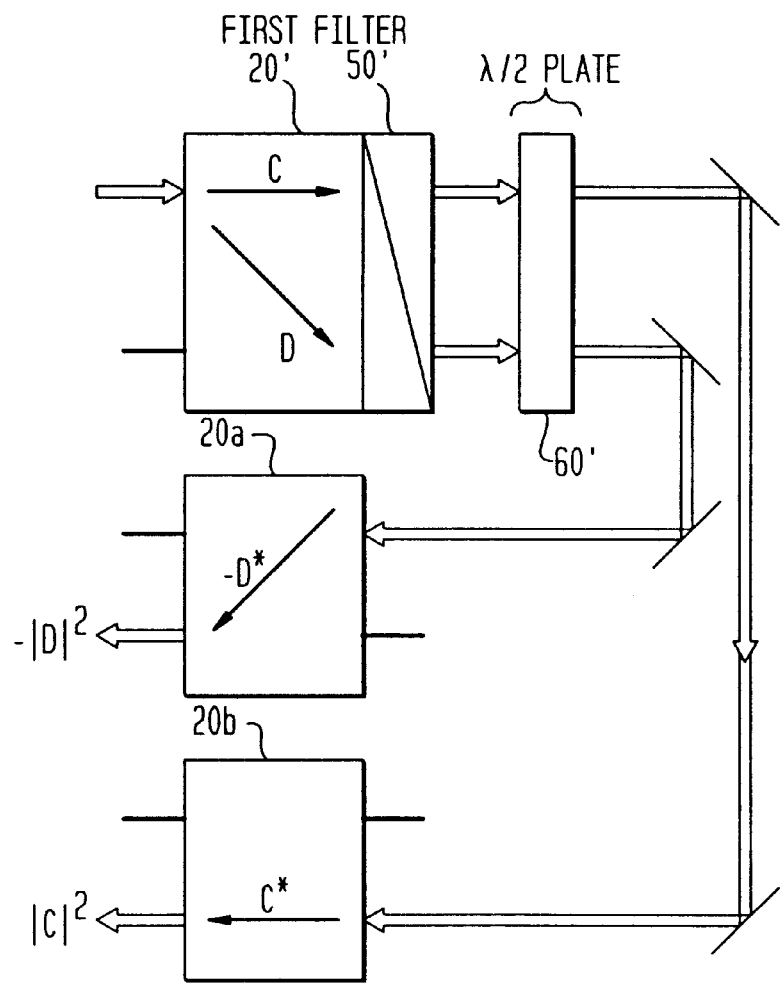
FIG. 5b shows a symbolic representation of a single-filter arrangement in accordance with the present invention in which the polarizations of both component beams are rotated before combining transfer coefficients C and D with their complex conjugates C* and −D* to give real valued coefficients $|C|^2$ and $|D|^2$ which are entirely free of dispersion.

As referred to above, the transmission coefficients for the second pass through the filter 20 that will cancel out dispersion from the first pass through the filter 20 are obtained by applying a suitable polarization rotation to the two component beams 82c, 82d. For this single filter, dual pass arrangement, the suitable polarization rotation is a rotation by 90 degrees of both component beams as shown in FIGS. 3 and 5(b). This causes each component beam to be filtered using the other polarization plane of the filter, resulting in the production of the complex conjugates of the transmission coefficients produced during the first pass. This rotation is achieved by passing both component beams 82c, 82d through a half-wavelength plate 64 to produce component beams 82e, 82f.

The component beams 82e, 82f are redirected through the filter 20 for the second pass by a redirector 100. Suitable redirectors include a reflector arrangement, such as a corner reflector 100. The second pass need not be in a direction opposite to the first pass, but it is convenient to do so, as shown in FIG. 3.

The second pass creates beams 82g and 82h having real valued coefficients $|C|^2$ and $|D|^2$. In addition to removing dispersion caused by the first pass, the second pass causes additional filtering. As a consequence there will be some small signal components orthogonal to those shown at 82g and 82h in FIG. 3. These unwanted components are removed by the fiber output stage (not shown).

Figure 1A:
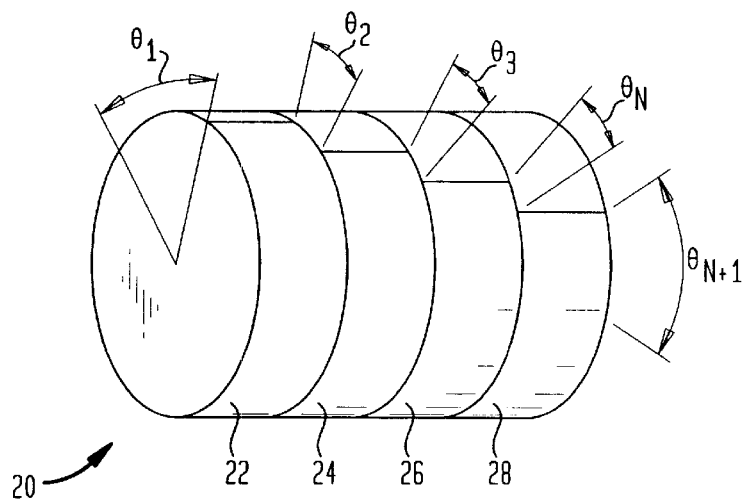
FIG. 1a shows an exemplary birefringent filter of the prior art comprising four birefringent plates.
Figure 1B:
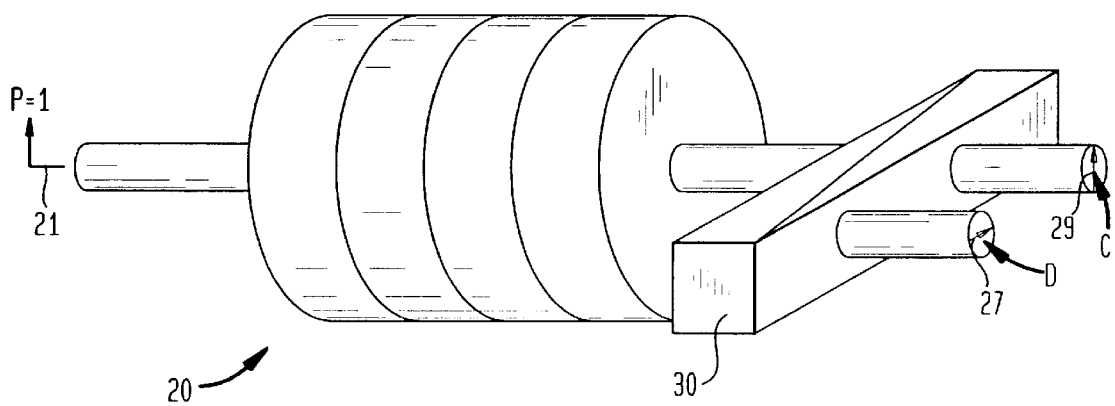
FIG. 1b shows the birefringent filter of FIG. 1a in conjunction with a beam displacer for separating an output beam into component beams.
Figure 1C:
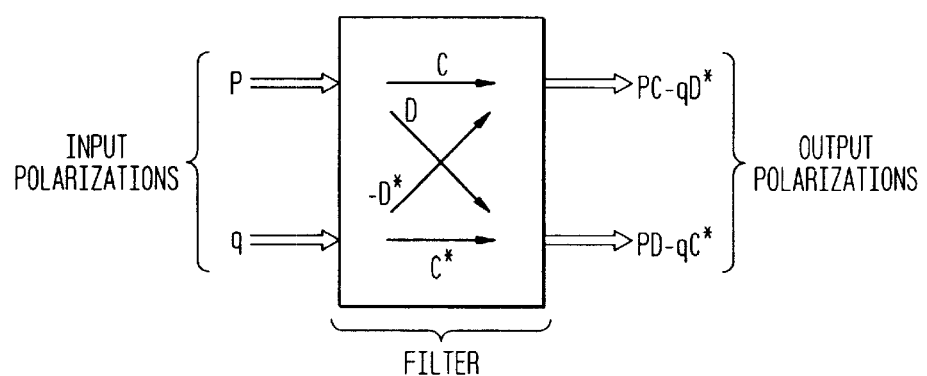
FIG. 1c shows a symbolic representation of the transmission coefficients and polarizations for signals output by the filter of FIG. 1b for a signal having input amplitudes of p, q.
Figure 2:
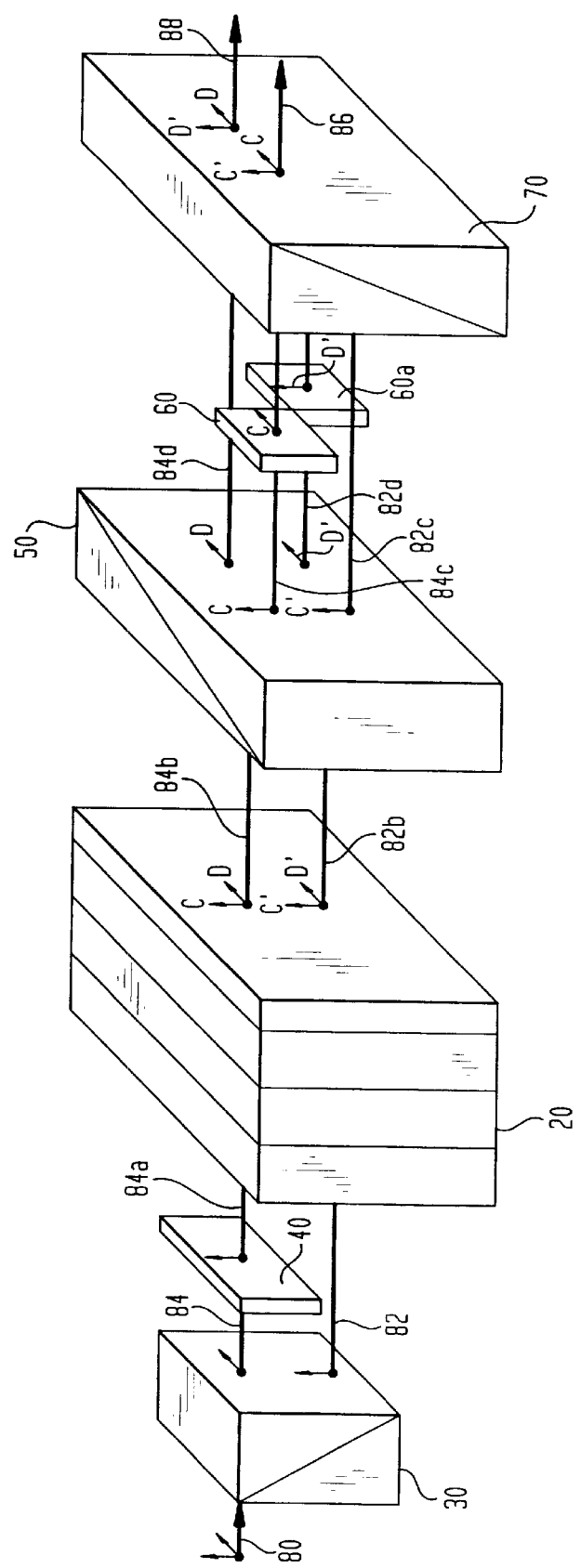
FIG. 2 shows an exemplary slicer using a birefringent filter as known in the prior art.
Figure 4:
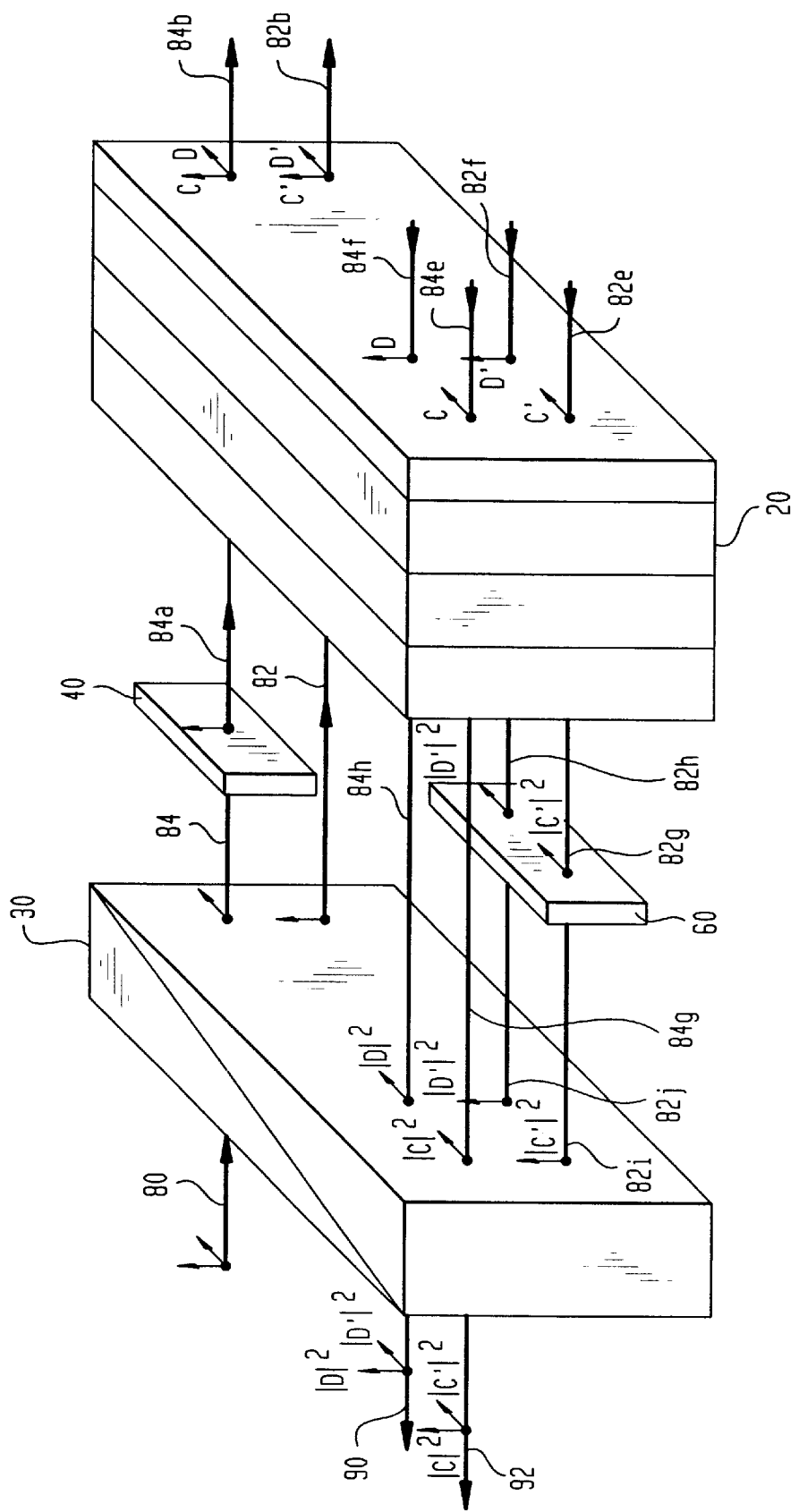
FIG. 4 shows the birefringent filtering system of FIG. 3 in conjunction with fiber input and output stages.

FIG. 4 shows a portion of the single filter, double pass filtering arrangement shown in FIG. 3, illustrating both input beams 82, 84a entering the filter 20 and the fiber input and output stages before and after the filter. The fiber input stage, similar to that shown in FIG. 3 includes a beam displacer 30 and a half-wavelength plate 40 between the birefringent filter 20 and the input fiber (not shown). The fiber output stage, similar to that shown in FIG. 2, includes a half-wavelength plate 60 and a polarization combiner 30 between the birefringent filter 20 and the two output fibers (not shown). Each output fiber (not shown) receives a single beam carrying orthogonally polarized like channels (i.e., beam 90 carrying only the odd channels and comprising orthogonally polarized component beams 82j and 84h and beam 92 carrying only the even channels and comprising orthogonally polarized component beams 82i and 84g). As a result of the double-pass arrangement, the filter output signals (82g, 82h, 84g and 84h) and the slicer output signals carried by beams 90, 92 are entirely free of dispersion caused by the birefringent filter.

In order to avoid undesirable delay difference between the two component beams being combined into a single output beam, e.g., component beams 82j and 84h, they must be characterized by essentially the same optical path length. This condition is satisfied to a good approximation, since the two paths include essentially the same components. For instance, the rotation of beam 84a by plate 40 produces the same delay as the rotation of beams 82g and 82h by plate 60. Any small differences in path length can be entirely removed by modifying the arrangement, for instance by including in either path a plate producing the required delay without affecting the output polarization.

This single filter, double-pass arrangement improves the ratio of channel separation to stopband width. For example, a ratio of less than 2.8 can be realized with very low levels of crosstalk by using a filter with five birefringent plates. In a single filter, single-pass arrangement, the same ratio would be difficult to realize, not only because it would require a large number of birefringent plates but also because very accurate fabrication of the slicer would be required in order to obtain low levels of crosstalk (less than −30 db).

Important parameters are the maximum level of crosstalk $\Delta$ that can be tolerated in the stopband, the ratio R of channel separation S to stopband width W, and the total number N of stages.

Figure 6:
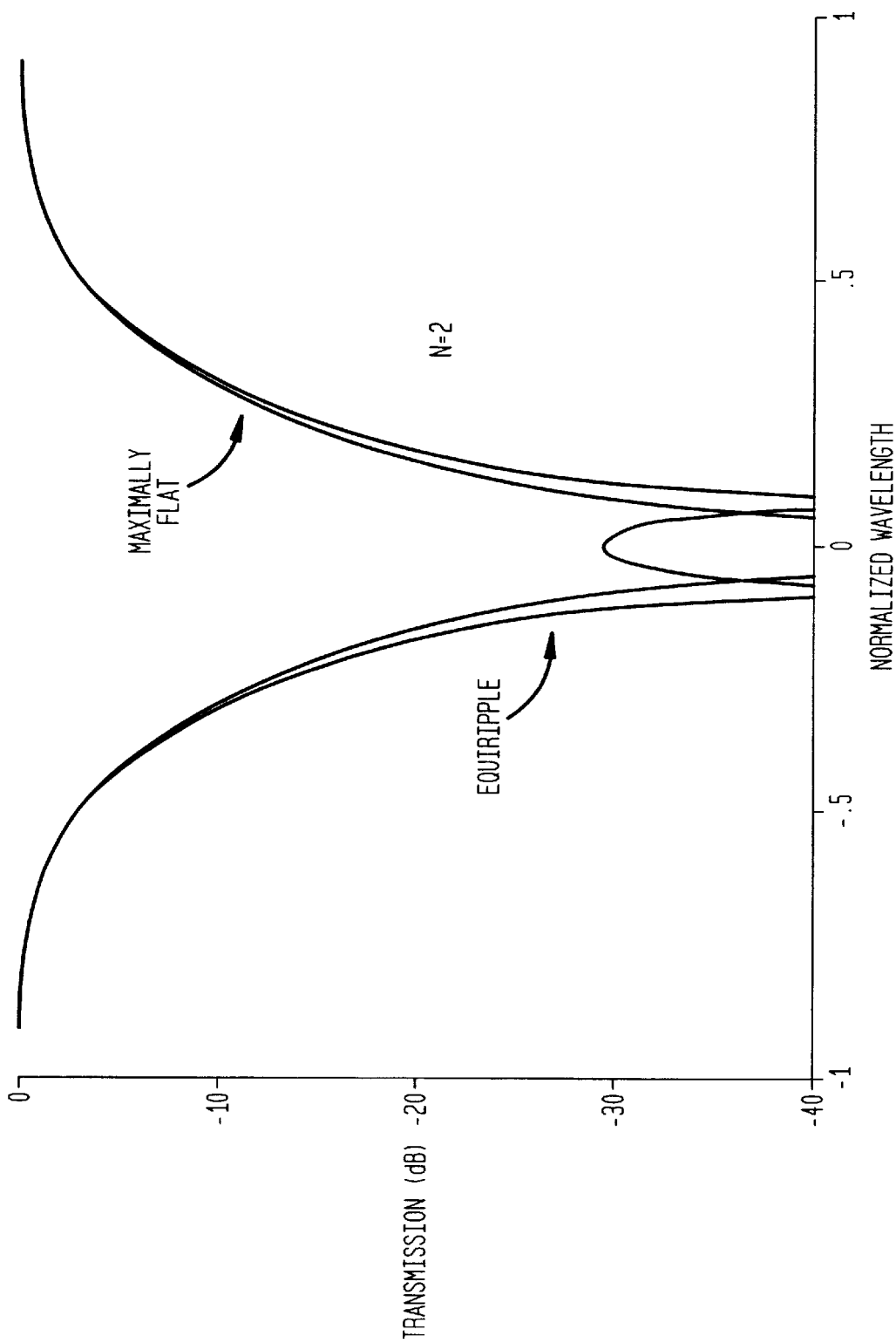
FIG. 6 is a graph of an optimized transfer function with equiripple behavior for a birefringent filter comprising two plates.
Figure 7:
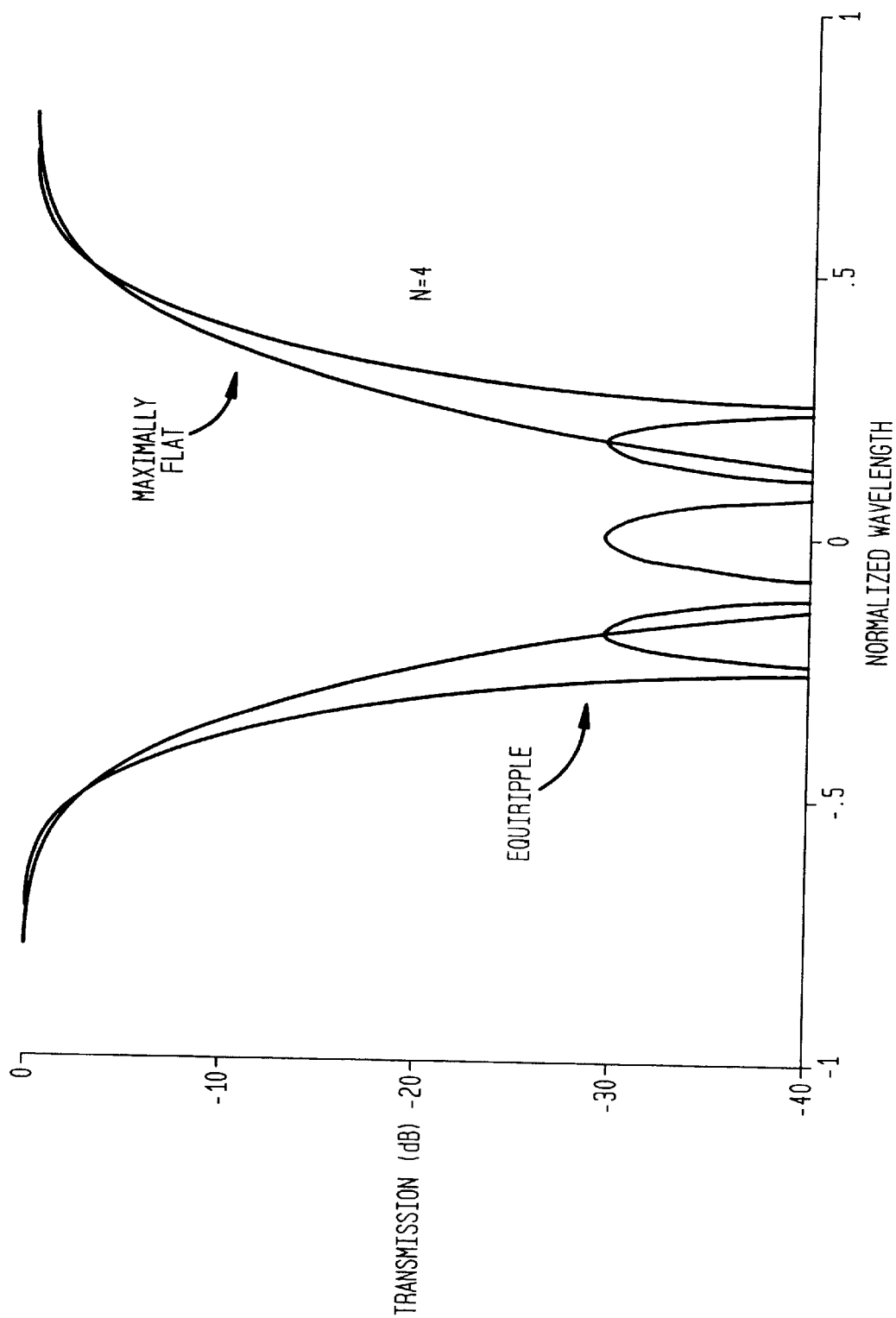
FIG. 7 is a graph of an optimized transfer function with equiripple behavior for a birefringent filter comprising four plates.
Figure 8:
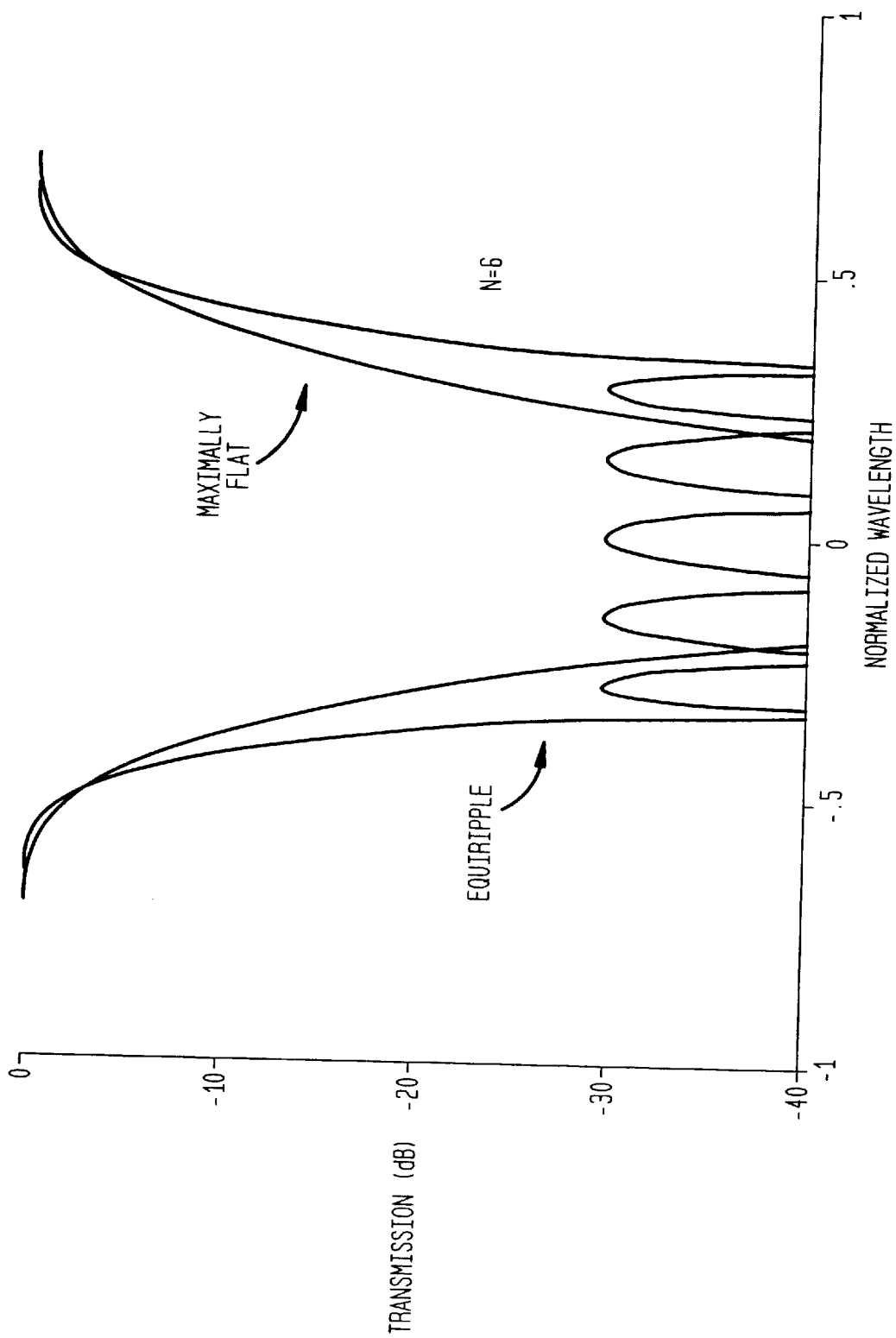
FIG. 8 is a graph of an optimized transfer function with equiripple behavior for a birefringent filter comprising six plates.
Figure 9:
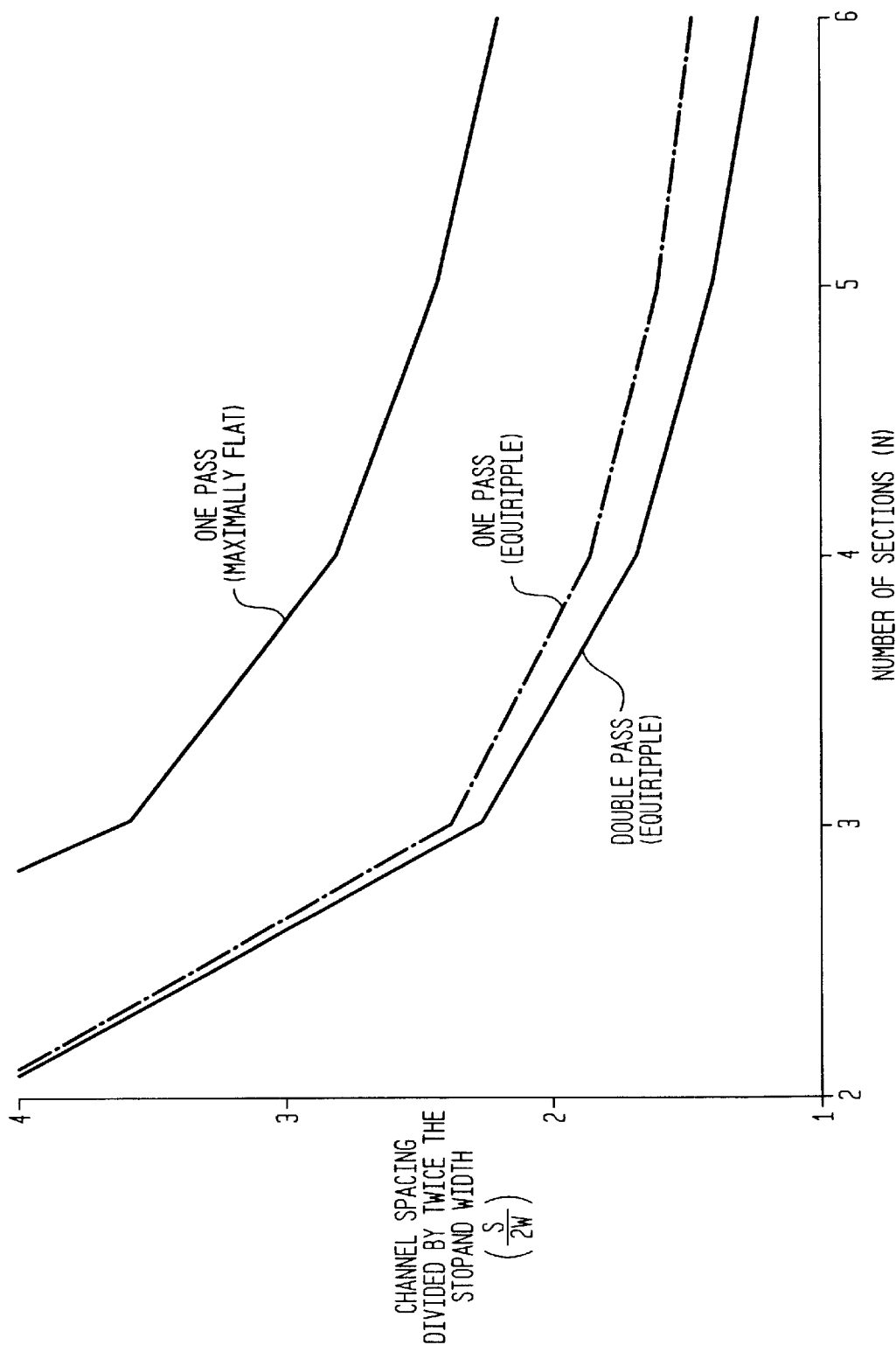
FIG. 9 is a graph showing the relationship between channel separation S, stopband width W and the number of plates N in a filter for single (prior art) and double pass filtering arrangements.
Figure 10:
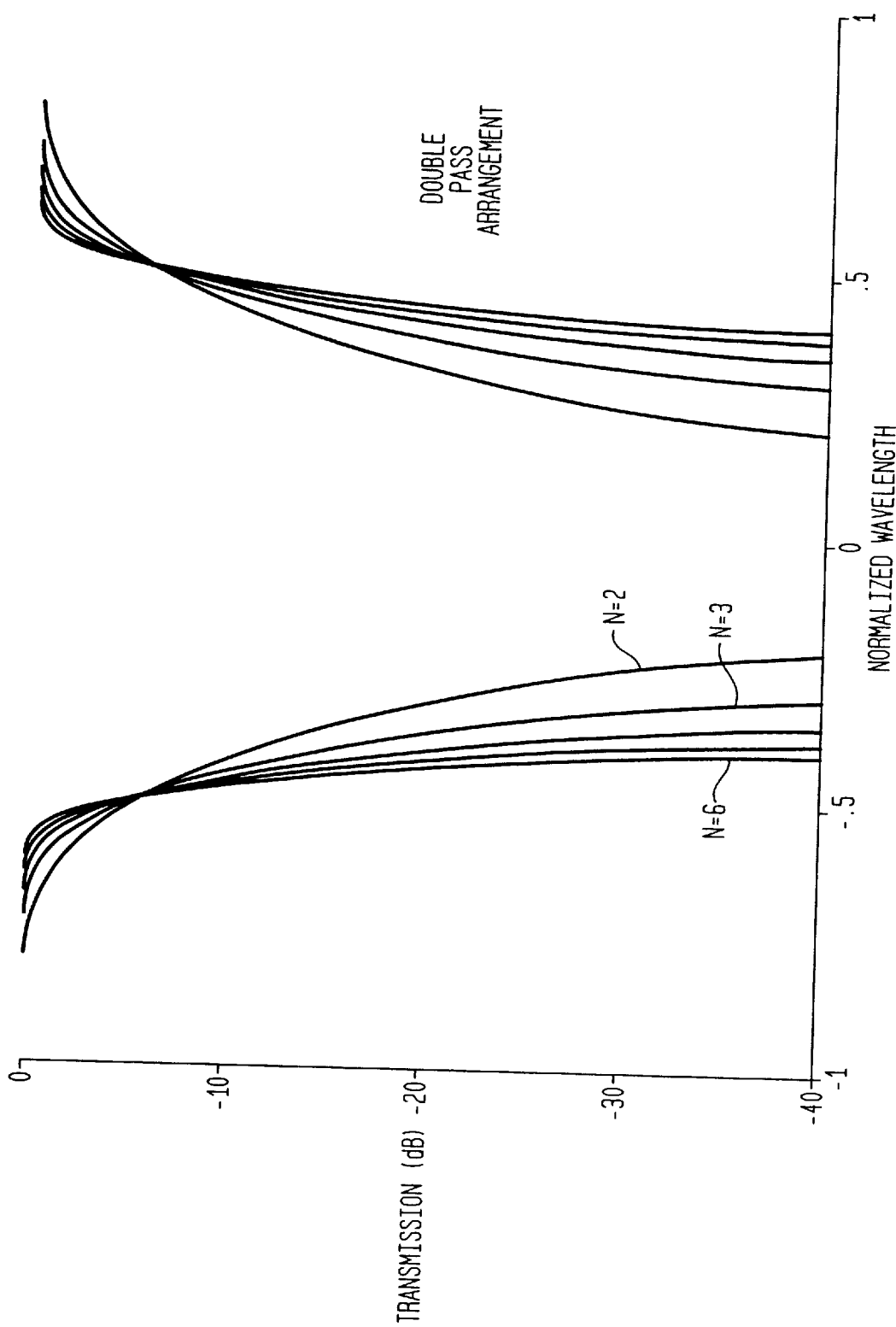
FIG. 10 is a graph of transfer functions for a double pass filtering arrangement in accordance with the present invention.

The optimum design that maximizes S is characterized by equiripple behavior, as shown in FIGS. 6, 7, and 8. The transmission coefficients shown in these figures were optimized by assuming a single pass, and a crosstalk tolerance of −30 dB. Also shown are the transmission coefficients obtained by minimizing crosstalk in the immediate vicinity of the center of the stopband, in which case maximally flat behavior is produced. FIG. 9 shows that the optimized ratio S in this case is much smaller than the optimum value obtained with equiripple behavior. FIGS. 9 and 10 show the results obtained with two passes as in FIGS. 3 and 4. In this case the crosstalk tolerance was assumed to be −40 dB. The double pass arrangement is less difficult to realize than with a single pass arrangement if low crosstalk tolerance is specified. The double pass arrangement reduces both the crosstalk power level and the required fabrication accuracy by a factor of 10. The reason for this is each pass in FIG. 9 can tolerate 10 times the crosstalk power that can be tolerated for a single pass in FIGS. 7 and 8. As a consequence, the required fabrication accuracy for the double pass arrangement is 10 times greater than in FIGS. 7 and 8.

An alternate embodiment is shown in 5a. In this multi-filter embodiment, a single pass is made through each filter 20', 20". In the arrangement shown, only one component beam 85 produced by beam displacer 50' is subjected to a 90 degree polarization rotation by a pass through a half-wavelength plate 60'. In this embodiment, the second filter 20" is effectively identical to the first filter. When combined with the half-wavelength rotation of beam 85, the second filter produces real valued coefficients $|C|^2$, $|D|^2$. In the alternate embodiment shown in FIG. 5b, two separate filters 20a, 20b filter the component beams shown. In yet another embodiment, similar to that shown in FIG. 5a, the second filter could be designed so that it produces coefficients $|C|^2$, $|D|^2$ without requiring the polarization rotation. However, separate filters are generally undesirable, because of cost and size considerations.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A filtering system for filtering an optical input beam carrying an optical signal having a linear input polarization, the system comprising:
   (a) a birefringent wavelength filter capable of transforming the input beam into an output beam having first and second orthogonal polarizations, the birefringent filter causing dispersion of the signal during a first pass of the signal therethrough;
   (b) a beam displacer for separating the output beam into first and second component beams having the first and second orthogonal polarizations, respectively;
   (c) a polarization rotator for rotating the polarization of both component beams; and
   (d) a redirector for directing the first and second component beams through the birefringent wavelength filter for a second pass to eliminate dispersion created during the first pass.

2. The filtering system of claim 1, wherein the redirector is positioned to direct the first and second component beams through the birefringent wavelength filter in a direction opposite to a direction of travel of the input beam during the first pass.

3. The filtering system of claim 1, wherein the polarization rotator is positioned between the beam displacer and the redirector.

4. The filtering system of claim 3, wherein a single polarization rotator is positioned to act upon the first and second component beams.

5. The filtering system of claim 4, wherein the redirector is positioned to direct the first and second component beams through the birefringent wavelength filter in a direction opposite to a direction of travel of the input beam during the first pass.

6. The filtering system of claim 1, wherein the polarization rotator comprises a half-wavelength plate producing a 90 degree polarization rotation and the redirector comprises a corner reflector.

7. A filtering system for filtering an optical input beam having a linear input polarization and carrying an optical signal comprising a plurality of subsignals, the filtering system comprising:
   a birefringent wavelength filter capable of receiving the input beam and separating the plurality of subsignals into an output beam comprising first and second linearly polarized components having first and second orthogonal polarizations and carrying first and second groups of said subsignals, respectively, the birefringent wavelength filter causing dispersion of the signal during a first pass of the signal therethrough;

a beam displacer for separating the components of the output beam into first and second component beams having the first and second orthogonal polarizations and carrying the first and second groups of subsignals, respectively;

a polarization rotator for rotating the polarization of both component beams; and a redirector for directing the first and second component beams through the birefringent wavelength filter to eliminate dispersion created during the first pass.

8. The filtering system of claim 7, wherein the wavelength birefringent filter comprises a plurality of adjacent birefringent plates, each of the plurality of adjacent birefringent plates being oriented at a unique angle relative to a reference axis.

9. The filtering system of claim 8, wherein the redirector is positioned to direct the first and second component beams through the birefringent wavelength filter in a direction opposite to a direction of travel of the input beam during the first pass.

10. The filtering system of claim 7, wherein the first group of the subsignals comprises even wavelength channels and the second group of the subsignals comprises odd wavelength channels.

11. The filtering system of claim 7, wherein the first group of the subsignals comprises odd wavelength channels and the second group of the subsignals comprises even wavelength channels.

12. The filtering system of claim 8, wherein the birefringent plates produce transfer coefficients having magnitudes that are optimized so that essentially equiripple behavior with maximum stopband width is produced by the first and second passes.

13. The filtering system of claim 8, wherein the polarization rotator comprises a half-wavelength plate producing a 90 degree polarization rotation and the redirector comprises a corner reflector.

14. A filtering system for slicing and filtering an optical beam carrying a plurality of subsignals on different wavelength channels, the filtering system comprising:

a beam displacer for splitting the optical beam into a first input beam carrying the plurality of subsignals oriented in a first input polarization and a second input beam carrying the plurality of subsignals oriented in a second input polarization orthogonal to the first input polarization;

a first polarization rotator for imparting the first input polarization to the second input beam;

a birefringent filter capable of transforming each input beam into an output beam carrying first and second groups of subsignals having first and second orthogonal polarizations, respectively;

a polarization beam displacer for separating each output beam into first and second component beams having the first and second orthogonal polarizations and carrying the first and second groups of subsignals, respectively;

a second polarization rotator for rotating the polarization of both component beams of each output beam;

a redirector positioned to direct the first and second component beams of each output beam through the birefringent filter for a second pass;

a third polarization rotator for rotating the polarization of the component beams of the first input beam;

a first polarization combiner for combining the first component beam of the first input beam with the first component beam of the second input beam into a first slicer beam carrying the first group of subsignals and having orthogonal polarizations; and a second polarization combiner for combining the second component beam of the first input beam with the second component beam of the second input beam into a second slicer beam carrying the second group of subsignals and having with orthogonal polarizations.

15. The filtering system of claim 14 wherein each polarization rotator comprises a half-wavelength plate producing a 90 degree polarization rotation, the redirector comprises a corner reflector and the first and second polarization combiners comprise a single polarization combiner.

16. The filtering system of claim 15, further comprising an additional plate in an optical path of one of the component beams for equalizing the optical path length of the component beam.

17. A method for filtering an optical beam carrying a signal having a linear input polarization, the method comprising the steps of:

(a) aligning the input polarization of the optical beam with a first plane of polarization of a birefringent wavelength filter;

(b) passing the optical beam through the birefringent wavelength filter to create an output beam having first and second orthogonal polarizations, the birefringent filter causing dispersion of the signal;

(c) separating the output beam into first and second component beams having first and second orthogonal polarizations respectively; and (d) passing the first and second component beams through a birefringent wavelength filter to eliminate dispersion created during step (b).

18. The method of claim 17, wherein the filter used in step (d) is configured to have transfer coefficients that are the complex conjugates of those produced by the filter used in step (b).

19. The method of claim 17, further comprising the steps of:

(e) rotating the polarization of at least one of the component beams, step (e) being performed before step (d), wherein the filter used in step (d) is configured to produce transfer coefficients which are the complex conjugate of those produced by the filter used in step (b).

20. The method of claim 19, wherein the same birefringent wavelength filter is used in steps (b) and (d) and wherein the polarization of both component beams are rotated in step (e).

21. The method of claim 20, further comprising the step of:

(f) reversing a direction of travel of the component beams, step (f) being performed intermediate steps (b) and (d).

22. The method of claim 21, wherein step (f) is performed by directing the component beams into a corner reflector.

23. A method for slicing and filtering an optical beam carrying a plurality of subsignals on different wavelength channels, the method comprising the steps of:

(a) splitting the optical beam into first and second input beams carrying the plurality of subsignals oriented in first and second orthogonal input polarizations;

(b) rotating the polarization of the second input beam to impart the first input polarization;

(c) passing the first and second input beams through a birefringent filter capable of transforming each input beam into an output beam carrying first and second groups of subsignals having the first and second orthogonal polarizations, respectively;

(d) separating each output beam into first and second component beams carrying the first and second groups of subsignals and having the first and second orthogonal polarizations, respectively;

(e) rotating the polarization of both component beams of each output beam;

(f) passing both component beams of each output beam through a birefringent filter to eliminate dispersion created in step (c);

(g) rotating the polarization of both component beams of one of the input beams;

(h) combining the first component beams of the first and second input beams to produce a first output beam carrying the first group of subsignals oriented in orthogonal polarizations; and (i) combining the second component beams of the first and second input beams to produce a second slicer output beam carrying the second group of subsignals oriented in orthogonal polarizations.

24. The method of claim 23, further comprising the step of:

(j) directing each component beam into a redirector positioned to direct the component beam through the birefringent filter for the second pass, step (j) being performed intermediate steps (d) and (f).

25. The method of claim 24, wherein steps (c) and (f) comprise using the same birefringent filter.

26. A method for slicing and filtering an optical beam carrying a plurality of subsignals, the method comprising the steps of:

(a) passing the optical beam through a beam displacer for splitting the optical beam into first and second input beams carrying the plurality of subsignals oriented in first and second orthogonal input polarizations, respectively;

(b) passing the second input beam through a polarization rotator for imparting the first input polarization to the second input beam;

(c) passing the first and second input beams through a birefringent filter capable of transforming each input beam into an output beam carrying first and second groups of subsignals having the first and second orthogonal polarizations, respectively;

(d) passing each output beam through a beam displacer for separating each output beam into first and second component beams carrying the first and second group of subsignals and having the first and second orthogonal polarizations, respectively;

(e) passing both component beams of each output beam through a polarization rotator;

(f) passing both component beams of each output beam through a birefringent filter to eliminate dispersion created in step (c);

(g) passing both component beams of one of the input beams through a polarization rotator;

(h) passing the first component beams of the first and second input beams through a polarization combiner to produce a first output beam carrying the first group of subsignals and having orthogonal polarizations; and (i) passing the second component beams of the first and second input beams through a polarization combiner to produce a second slicer beam carrying the second group of subsignals and having orthogonal polarizations.

27. The method of claim 26, further comprising the step of:

(j) directing each component beam into a redirector positioned to direct the component beam through the birefringent filter for the second pass, step (j) being performed intermediate steps (d) and (f).

28. The method of claim 27, wherein the same birefringent filter is used in steps (c) and (f).

29. The method of claim 28, wherein each polarization rotator comprises a half-wavelength plate providing a 90 degree polarization rotation, the redirector comprises a corner reflector and the first and second polarization combiners comprise a single polarization combiner.

* * * * *